United States Patent Office 2,807,615
Patented Sept. 24, 1957

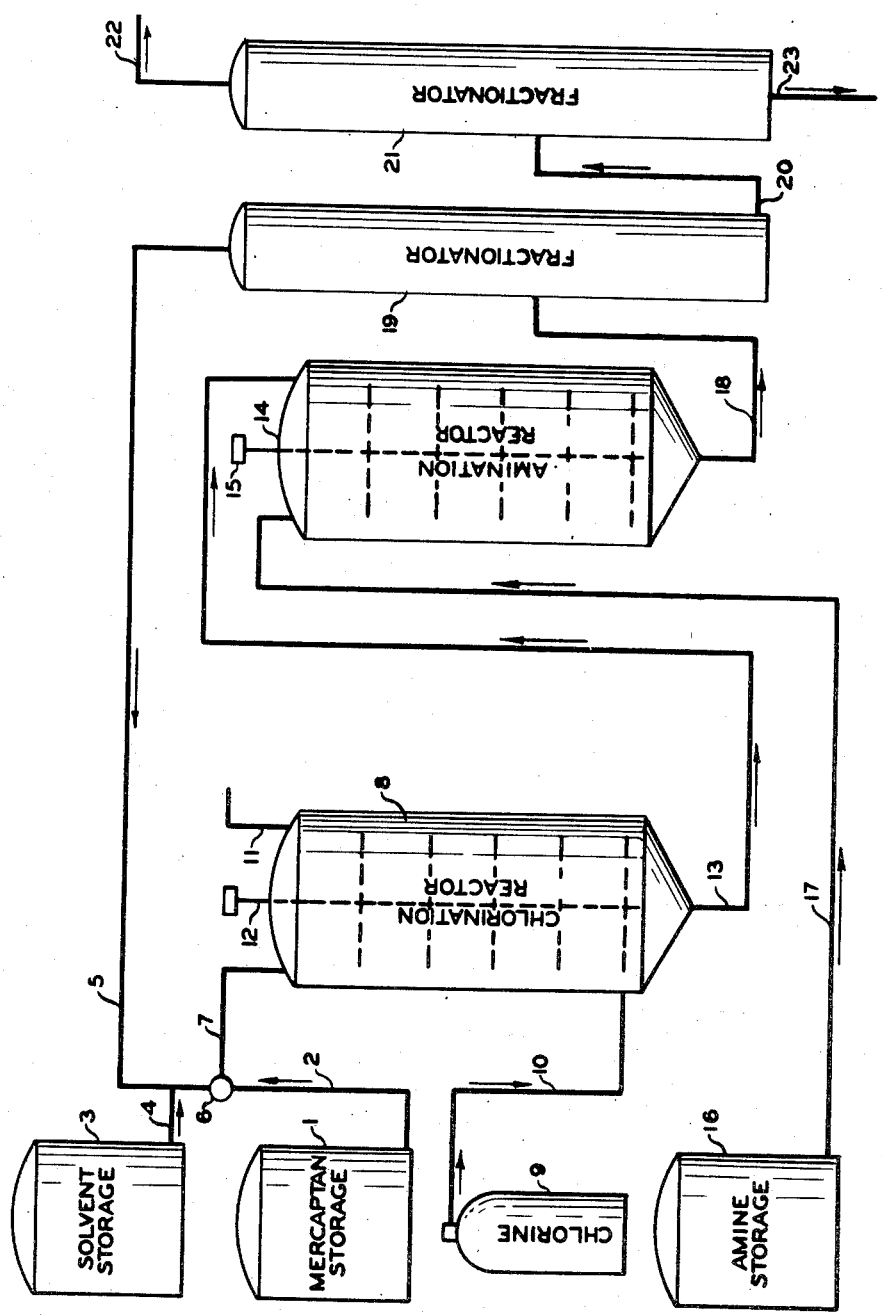

2,807,615

ALKYL THIOSULFENAMIDES AND PROCESS OF PRODUCING THEM

Chester M. Himel, Menlo Park, Calif., assignor to Phillips Petroleum Company, a corporation of Delaware Original application October 21, 1953, Serial No. 387,386. Divided and this application November 30, 1953, Serial No. 395,139

32 Claims. (Cl. 260—247.1)

This invention relates to sulfur-containing organic compounds and to their preparation. In another aspect this invention relates to alkyl thiosulfenamides as new compounds and to their preparation. In another aspect this invention relates to the preparation of sulfenamides by reacting an amine with an alkyl sulfenyl halide or an alkyl thiosulfenyl halide. In still another aspect this invention relates to a process wherein a halogen, an amine and a disulfide and/or a mercaptan are interacted in a single reaction step to form a sulfenamide. In still another aspect this invention relates to a multi-step process wherein a disulfide and/or a mercaptan is reacted with a halogen to produce an organic sulfur-containing halide, and wherein a resulting reaction mixture is then admixed with an amine under conditions causing reaction of halide therein, with amine, to produce a sulfenamide.

This application is a division of my application Serial No. 387,386, filed October 21, 1953, which is a continuation-in-part of my application Serial No. 89,475, filed April 25, 1949, now abandoned, the latter being a continuation-in-part of Serial No. 617,871, now abandoned, filed September 21, 1945.

An object of this invention is to provide a method for preparing sulfur-containing organic compounds.

Another object of this invention is to provide a method for preparing alkyl sulfenamides.

A further object of this invention is to provide a method for preparing alkyl thiosulfenamides.

Another object of this invention is the production of tertiary alkyl thiosulfenamides as novel compounds.

Another object is to provide a process for preparing alkyl sulfenyl halides and alkyl thiosulfenyl halides as intermediate reaction products and without isolation reacting said intermediate products directly with ammonia or a primary or a secondary amine to provide corresponding sulfenamides.

In accordance with this invention, an alkyl mercaptan is caused to interact with a halogen to form at least one of an alkyl sulfenyl halide and a tertiary alkyl thiosulfenyl halide. Also, in accordance with this invention, a dialkyl disulfide is caused to interact with a halogen to form at least one of an alkyl sulfenyl halide and a tertiary alkyl thiosulfenyl halide.

The principal reaction product can be isolated, and reacted, or reacted as a component in the resulting reaction mixture, with at least one nitrogen compound selected from the group consisting of ammonia and primary and secondary amines to form a sulfenamide and/or a thiosulfenamide as the principal reaction product.

When desired, the nitrogen compound reactant can be introduced into the halogen-mercaptan and/or disulfide reaction mixture and therein reacted with sulfenyl and/or thiosulfenyl halide product to form the said sulfenamide.

The above reaction, in one embodiment, is conducted employing an inert solvent. Further, in another embodiment, substantially anhydrous conditions are employed and such conditions can prevail in the presence of an inert solvent or diluent or in the absence of such inert solvent or diluent. It is noted herein that anhydrous conditions are not essential to obtaining of the halogenated sulfur product compounds. Thus, good yields are shown herein to have been obtained in the presence of water. Such yields can be obtained whether or not an inert diluent or solvent is employed.

Alkyl sulfenyl halides are particularly useful as intermediates for the production of other compounds, such as the corresponding sulfenamides which can be used as additives for lubricating oil, as leather processing chemicals, surface active agents, flotation agents, resin intermediates, etc. Alkyl thiosulfenylhalides are also versatile intermediates for the production of useful organic chemicals. Being highly reactive, they combine substantially quantitatively with a wide variety of reactants to provide sulfur containing products of wide utility. Tertiary alkyl sulfenyl halides are particularly well applied to the preparation of tertiary alkyl sulfenyl thiocyanates as set forth and claimed in U. S. Patent No. 2,572,565, issued October 23, 1951, to Chester M. Himel and Lee O. Edmonds.

Many uses have been discovered and developed for the organic sulfur amides such as the sulfenamides and thiosulfenamides. Among the numerous uses to which the sulfenamides and thiosulfenamides have been applied are included uses as antioxidants for lubricating oil, as corrosion inhibitors for general use, and as intermediates in the production of other useful compounds. These compounds, when added in relatively small quantities in the range of 0.01 to 5.0 percent by weight to lubricating oils, favorably inhibit the tendency of the oils to oxidize and, at the same time, do not produce deleterious effects on other properties. These compounds also enhance the anti-corrosive properties of the oils in engine performance. The alkylene polyamine sulfenamides and thiosulfenamides are set forth as lubricating oil additives in inhibiting oxidation and corrosion, in U. S. Patent 2,671,804, issued March 9, 1954, to me and L. O. Edmonds.

Alkyl mercaptan or dialkyl disulfide reactants of any desired molecular weight can be employed, although generally the said reactant is one haivng about twelve carbon atoms per alkyl group, or less. It is further preferred, as such reactant, to have one in which the alkyl radicals are unsubstituted and thus contain only carbon and hydrogen. The alkyl groups of the dialkyl disulfide can be the same or different.

Included in the halogen reactants employed are chlorine, bromine, iodine, and fluorine, and of these, chlorine is now preferred due to its low cost and ready availability. Bromine and iodine are ordinarily used in the liquid and solid state, respectively. At higher temperatures, i. e., above −30° F., chlorine can be used either in the liquid state or in the gaseous state. At lower temperatures, chlorine is in the liquid state at the optimum reaction temperatures, and it is preferred to use it in this form.

Ordinarily, the modus operandi preferred will be the addition of halogen to the mercaptan and/or the disulfide, either batchwise or in a continuous operation. When operating on a continuous basis substantially equimolar proportions of reactants can be admixed together or the halogen can be added step-wise to the sulfur-containing compound in which event provisions should be made as required, for example, to cool the reacting mass. When operating batchwise the halogen is added to the mercaptan or disulfide gradually and usually in an amount not to exceed one mol of halogen per mol of mercaptan or disulfide.

It is generally advantageous, although not required, to conduct the halogen-mercaptan or disulfide reaction in the presence of a solvent inert chemically to the reaction mixture. As such an inert solvent in my process I prefer to employ a paraffin hydrocarbon since the yield and purity of the products are usually higher with this type of solvent than with other solvents. Low-boiling, normally liquid paraffins, for example, normal pentane, isopentane or normal hexane are particularly applicable since they have the advantages of chemical inertness and low boiling point, the latter characteristic rendering them easily removable from the reaction product by fractionation. Higher boiling paraffins can be employed, if desired, but they are less preferable because their high boiling point causes difficulty in separating the solvent from the product.

While I have generally preferred to employ a single hydrocarbon as the solvent, mixtures of hydrocarbons can be employed. For example, suitable cuts or fractions of natural gasoline or any other suitable paraffin mixture which is free from objectionable impurities can be used. Best results are obtained when the solvent is free from appreciable amounts of sulfur and sulfur compounds, oxygen compounds, nitrogen compounds, unsaturated hydrocarbons such as olefins, diolefins and acetylenes, aromatics, naphthenes and any other impurities which would interfere with the reaction or contaminate the product.

Instead of paraffin hydrocarbons, other inert organic solvents can be employed in my process. Among these solvents are chlorinated hydrocarbons such as chloroform, carbon tetrachloride, ethylene dichloride, ethylidene dichloride, etc. In some instances, the use of halogenated solvents tends to reduce the yield of the desired product, and in such instances, those solvents are less desirable than the preferred paraffin hydrocarbon solvents. Further, refinery streams containing mercaptans and/or disulfides can be used in my process, provided these streams are free of objectionable impurities described above.

The reaction of halogen with mercaptan or disulfide can be carried out in the absence of an extraneous solvent or diluent. When starting with disulfide in the absence of other material which acts as a diluent or solvent, it is preferred to add less than the stoichiometric amount of halogen and thus have present at all times unreacted disulfide. When starting with mercaptans in the absence of other material which acts as a diluent or solvent, it will be necessary to add sufficient halogen to convert all the mercaptan to disulfide and then proceed as stated above for disulfide.

The reaction of this invention can be accomplished over a wide range of temperatures. I have obtained products in substantial yield at temperatures approximating 400° F. and at temperatures as low as —300° F. When using the more readily available reactants I usually prefer to employ a temperature in the range of about —125° F. to about 250° F., preferably —125° F. to about 150° F. For reasons which appear herein, the said ranges are presently preferred. Though certain ranges are preferred, temperature is not critical in the sense that the reactions of the invention do not appear to be limited to the specific ranges herein set forth. Thus, temperatures somewhat higher than herein set forth are operative.

In the practice of one embodiment, when a primary or secondary alkyl mercaptan or dialkyl disulfide is employed, the principal reaction product is an alkyl sulfenyl halide; and when employing a tertiary alkyl mercaptan or dialkyl disulfide, the principal reaction product is dependent upon the reaction temperature employed. More specifically, when employing the tertiary alkyl mercaptan or disulfide reactant, I have found that, when the temperature is within the range of —300 to —30° F., and preferably within the range of —125 to —50° F., the principal reaction product is the tertiary alkyl thiosulfenyl halide. I have found further that, when I use temperatures above —30° F., and preferably from 40 to 250° F., the principal reaction product is the tertiary alkyl sulfenyl halide. At these higher temperatures and at temperatures above the range of this embodiment, the formation of the tertiary alkyl thiosulfenyl halide proceeds concomitantly with the formation of the tertiary alkyl sulfenyl halide, but the latter is the principal product of the reaction and the former is formed in a smaller proportion than at temperatures below —30° F.

The pressure of reaction is ordinarily maintained at substantially atmospheric, but higher or lower pressures can be employed. For example, if butane or propane is used as the solvent, the pressure should be sufficiently high to maintain it in the liquid state. In some cases the pressure can be sufficiently high to hold the chlorine, when it is used as the halogen for the reaction, in the liquid state, but insufficiently great to liquefy the hydrogen chloride liberated during the reaction.

In one embodiment the mercaptan or disulfide is preferably maintained in the liquid state during the halogenation. This can be accomplished by adjusting the temperature and pressure, either in the presence or absence of a solvent or diluent.

In accordance with one embodiment in which I employ a temperature of —30° F. and lower, I prefer to use a solvent such as a low molecular weight hydrocarbon, e. g., propane, butane, pentane, etc., which is normally liquid at the reaction temperature. In some instances, it can be desirable to choose a solvent that boils at the optimum reaction temperature. The reaction is advantageously conducted under the vapors of the refluxing solvent which provides an inert atmosphere over the reaction mixture. In the event that the solvent employed does not boil at the optimum temperature level for the reaction, a suitable blanketing gas, such as nitrogen, can be introduced to provide the desired inert atmosphere.

When operating at the lower temperatures suitable for the formation of the tertiary alkyl thiosulfenyl halides, I prefer to use tertiary dialkyl disulfides as the starting material, but tertiary alkyl mercaptans can be used. When starting with tertiary alkyl mercaptans, for best results I regulate the proportion of mercaptan to halogen in the feed stream in such a manner that the mercaptan is first converted to the disulfide which then is an intermediate in the reaction. After conversion of the mercaptan to the disulfide, the reaction proceeds to the formation of the tertiary alkyl thiosulfenyl halide.

When a reaction is effected between a primary or a secondary alkyl mercaptan or a primary or secondary dialkyl disulfide and a halogen and between a tertiary alkyl mercaptan or dialkyl disulfide and a halogen at a temperature above —30° F., the principal reactions can be expressed as follows:

(1) 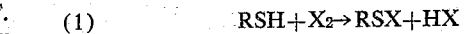
$$RSH + X_2 \rightarrow RSX + HX$$

(2) 
$$RSSR + X_2 \rightarrow 2RSX$$

wherein R represents an alkyl radical and X represents a halogen. When a reaction is effected between a tertiary alkyl mercaptan or dialkyl disulfide and a halogen at a temperature below —30° F., the principal reaction can be expressed as follows:

(3) 
$$RSSR + X_2 \rightarrow RSSX + RX$$

wherein R represents a tertiary alkyl radical and X represents a halogen. It will be understood that in Equation 3 the RSSR compounds can be formed from corresponding mercaptans whose formula can be expressed as RSH and that it is within the scope of my invention to produce the compounds shown as RSSX in Equation 3 from mercaptans.

As can be noted from the foregoing description of the invention, according to this invention, I have discovered that it is possible to obtain an alkyl sulfenyl halide and/or an alkyl thiosulfenyl halide if the halogen and the mercaptan and/or dialkyl disulfide are caused, respectively, to interact in equimolar proportions. One way to cause such an equimolar reaction is to employ equimolar ratios of reactants. Of course, if less halogen is passed into the reaction mass than is molecularly equivalent to the alkyl mercaptan or to the dialkyl disulfide, then less of the desired product will be obtained. However, the point to note is that the invention is in the finding that equimolar ratio reaction in the reaction mass can be obtained to form the products here discussed. Therefore, herein and in the claims the invention is not limited to any particular modus operandi or proportions actually taken to obtain as a net result an equimolar reaction forming the alkyl sulfenyl halide and/or the alkyl thiosulfenyl halide in the reaction mass, unless specifically so stated. Accordingly, an excess of halogen, although not desired, can be employed provided the reaction is nevertheless by conditions employed caused to be equimolar.

When referring to "equimolar proportions" herein and in the claims it is to be understood to mean that "equimolar proportions" is that proportion of halogen which is chemically interacted in the reactoin mass with the said mercaptan and/or disulfide to yield at least one of the group of alkyl sulfenyl halide and tertiary alkyl thiosulfenyl halide. In other words, "equimolar proportions" is a limitation based upon the reaction equations set forth herein, which is a visual representation of that which present methods of analysis which have been employed, indicate to be occurring when halogen and mercaptan and/or disulfide reactants are contacted each with the other, the proportions of halogen being so selected that appreciable quantities of alkyl sulfenyl halide and tertiary alkyl thiosulfenyl halide are formed. Thus, the invention herein covered is accomplished in one embodiment, by merely passing halogen in contact with the disulfide and/or mercaptan reactant until by testing, an appreciable quantity of alkyl sulfenyl halide and/or tertiary alkyl thiosulfenyl halide have been formed in recoverable amounts.

By "reacting" herein and in the claims is meant that reaction conditions are arranged with respect to proportion of reactants and other conditions to obtain an appreciable proportion of the product of the claim as a result of an equimolar reaction of the halogen with the mercaptan and/or the dialkyl disulfide.

The rate of addition of halogen can be so regulated that free halogen does not appear in the vent gases. As a feature of the invention, it is desirable to vent the system through a refrigerated condenser maintained at a temperature such that halogen will be condensed and returned to the reactor while hydrogen halide passes through unchanged. Also, if a diluent is employed which is vaporized at the reaction conditions, it will be condensed and returned to the reaction zone by such a condenser. By so operating, the rate of reaction can be somewhat accelerated.

When the mercaptan or disulfide used tends to be vaporous at the temperature of reaction, sufficient pressure to keep it in the liquid phase can be employed. Such a pressure when the reactant tends to be vaporous is now preferred.

The addition of halogen will be accomplished at a pressure sufficient to maintain a desired inflow of the same at each operating pressure. The rate of halogen addition can be varied over a rather wide range. Since the reaction of this invention is exothermic in nature, the maximum rate of halogen addition will be dependent on the maximum rate at which heat can be removed from the reaction mixture. That is, the halogen must not be added at a rate greater than that at which the heat can be removed and at the same time keep the temperature of the reaction mass below the desired maximum. Also the rate will usually not exceed a rate such that the halogen is substantially completely reacted as it is added. Preferably this rate will be in the range of about 1 to about 25 mols of halogen per mol of sulfur-containing compound per hour.

Although the halogen-mercaptan and/or halogen-dialkyl disulfide reaction of this invention can be conducted in the presence of water, somewhat higher yields of halide product are obtained at lower water concentrations. However, I have found that it is not generally advantageous, nor necessary, to dry the reactant materials to be introduced into the halide-forming reaction zone, reactants in their nomal state of purity generally being sufficiently devoid of water that a product yield, substantially the same as that obtained when pre-dried reactants are employed, is obtained.

As stated, the alkyl sulfenyl halides and alkyl thiosulfenyl halides produced in accordance with my invention are useful as intermediates for the production of other chemical compounds, particularly, by amination to produce sulfenamides. When it is desired to produce other compounds, such as sulfenamides, reactions with either the alkyl sulfenyl halides or the alkyl thiosulfenyl halides can be effected without separating the halides from the reaction mixture resulting from the halogenation reaction. If desired, however, the halide can be recovered in any suitable way from the reaction mixture resulting from the halogenation prior to its use in an amination reaction.

To effect an amination of the alkyl sulfenyl or thiosulfenyl halides produced by the halogenation reaction described herein the halide is ordinarily reacted with ammonia or with a primary or secondary amine by adding the ammonia or amine to the reaction mixture resulting from the halogenation reaction. This eliminates the expense and inconvenience of isolating or purifying the halide. In some cases it may be desirable to add the reaction mixture containing the halide, to the amine. When reacting primary or secondary sulfenyl halides with amines, it is preferred to add the sulfenyl halide solution to the amine, in order to obtain the highest possible yield. Instead of completing the formation of the halide before adding the ammonia or amine, the latter can be introduced during the step of forming the halide or, if desired, it can be admixed with the mercaptan or disulfide and solvent, if employed, before the introduction of the halogen is begun.

While ammonia can be employed in the amination reaction, I often prefer to employ a primary or secondary amine. Any primary or secondary amine can be employed. Alkyl, cycloalkyl, alkylcycloalkyl, cycloalkylalkyl, aryl, alkaryl or aralkyl amines are suitable, examples being aniline; toluidine; alpha-naphthylamine; beta naphthylamine; N-methylaniline; benzylamine; aliphatic amines such as methyl, ethyl, propyl, butyl, and higher amines, dimethyl, diethyl, dipropyl, dibutyl and higher dialkyl amines, methylethylamine; cyclohexylamine; 2-methylcyclohexylamine; N-methylcyclohexylamine; 2-cyclohexylpropylamine; N-ethylmethylcyclohexylamine; etc. Heterocyclic amines which are secondary rather than tertiary amines can be employed. Thus, morpholine is very suitable whereas pyridine cannot be used. Other heterocyclic amines which can be employed are piperidine, methylpiperidine, dimethylpiperidine, ethylpiperidine, hexahydrocollidine, and the like.

The amine can be introduced in any suitable manner to the solution with which it is to be reacted. For example, it can be added as such either in solid form or, where suitable, in the liquid state or it can be added as a solution in a suitable solvent.

The amount of ammonia or of primary or secondary amine employed can vary within rather wide limits. Ordinarily, I prefer to use a stoichiometric excess of ammonia or the amine over the halide. For example, I can employ from two to four mols of ammonia or the amine per mol of halide. A more preferable ratio within the range of 2.5 to 3.0 mols of ammonia or the amine per mol of halide is very satisfactory.

Following the amination reaction, the amide is separated from the reaction mixture in any suitable manner. The excess ammonia or amine is also removed in any suitable way, for example, by water washing where the amine is water soluble. The reaction mixture freed of excess ammonia or amine can then be evaporated to remove the solvent. Preferably the solvent removal is done in vacuo to minimize decomposition.

A typical example of the amination reaction I have described above is that which occurs between tertiary butyl sulfenyl chloride and morpholine, and it can be expressed as follows:

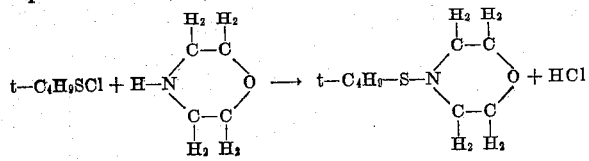

The hydrogen chloride given off by the reaction usually forms the hydrochloride of the amine. The product formed is 4-(tert-butylsulfenyl) morpholine. Other typical reactions will be found in the specific examples hereinbelow.

The accompanying diagrammatic drawing depicts a preferred embodiment of my invention without the inclusion of such standard equipment as pumps, compressors, etc., in order to make the drawing readily understandable.

Referring to Figure 1, an alkyl mercaptan (and/or a dialkyl disulfide, if desired) is drawn from storage 1 via line 2 and admixed with solvent withdrawn from storage 3 via line 4 and from recycle line 5 (to be described below). The solvent and mercaptan are mixed in a suitable mixing device 6, and the resulting mixture passes via line 7 to halogenation reactor 8. Chlorine from storage 9 passes to reactor 8 via line 10. It is preferable to bubble the chlorine slowly through the resulting solution until an amount of chlorine which is stoichiometrically equivalent to the mercaptan, has been introduced. However, in any event, the reactants are added in any desired relative amounts so as to effect equimolar reaction of halogen with disulfide and/or mercaptan to form alkyl sulfenyl halide and/or tertiary alkyl thiosulfenyl halide products. In this way the chlorine is reacted substantially as rapidly as it is added and the presence of free chlorine in any substantial amount in the solution is avoided. The chlorine is introduced at a rate such that substantially all of it is reacted before it can leave the solution. If desired, the reaction zone can be provided with a condenser to condense from the vent gases any material higher-boiling than hydrogen chloride including any chlorine which appears therein and to return same to the reaction zone. Such a condenser allows the hydrogen chloride to escape from the system without allowing any chlorine or solvent to escape. Removal of the hydrogen chloride is desirable because it displaces the equilibrium in the desired direction. Reactor 8 is provided with line 11 for venting the hydrogen chloride and with agitator 12 for suitable agitation and intimate contact of the reactants. Intimate contact can be obtained in any other manner such as by the use of centrifugal mixing pumps, jets, orifices, etc. If desired the reaction can be carried out in a vertical column equipped with packing or bubble plates for promoting intimate contact, with a reboiler at the bottom and with means for refluxing at the top of the column with only hydrogen chloride passing overhead. The mercaptan, solvent and the chlorine can be introduced at appropriate intermediate points in the column and the halide, either by itself or more usually as a solution in the solvent, is withdrawn as bottom product. This method of operation has the advantage that the reaction products are removed from the zone of reaction as soon as formed with the result that the preferred reaction is favored and side reactions are minimized.

Effluent from reactor 8 containing the halide and solvent along with small quantities of hydrogen chloride and unreacted mercaptan and chlorine passes via line 13 to amination reactor 14 provided with agitator 15. The amine from storage 16 enters reactor 14 via line 17, and the desired reaction between the halide and the amine for the formation of the corresponding amide takes place. The effluent from reactor 14 which comprises the amide and solvent along with unconverted reactants passes via line 18 to fractionator 19 where the solvent is removed overhead for recycle via line 5. The higher boiling residue passes via line 20 to vacuum fractionator 21 from which the desired amide is discharged as product via line 22 and higher boiling bottoms are removed via line 23.

Conditions of temperature and pressure can be substantially the same in both the halogenation and amination steps. I prefer to use a temperature for amination within the range of −20 to 120° F. and more preferably from 40 to 60° F., although temperatures outside the broad range can be employed. The amination pressure will usually be atmospheric, but higher and lower pressures can be used, when desired.

In the above description of my drawing, I have described a process wherein an alkyl mercaptan is halogenated and the resulting product is subsequently aminated. From the complete disclosure of my invention, numerous modifications are possible and are within the scope of my invention. For example, I can use a dialkyl disulfide in place of an alkyl mercaptan. Also, if it is desired to produce the halide as the reaction product, line 13 can be opened prior to the introduction of the halide into the amination reactor with the consequent withdrawal of the halide.

The following specific examples are illustrative of my invention.

EXAMPLE I

Tert-butyl mercaptan (0.5 mol—45 grams) was added to 200 grams of C. P. n-pentane. The reaction mixture was stirred during the addition of 35.5 grams (0.5 mol) of chlorine, which was added by bubbling into the reaction mixture. The temperature was held at about 85° F. during the reaction. A Dry Ice-cooled condenser allowed the hydrogen chloride to vent from the reaction and returned any chlorine and heavier volatilized material. Tertiary butyl sulfenyl chloride was formed as a predominant product together with a minor amount of tertiary butyl thiosulfenyl chloride. Morpholine (1.5 mols—120 grams) was added. The reaction mixture was poured into water and washed several times to remove morpholine and morpholine hydrochloride. The pentane was then removed in vacuo and the resulting liquid was stripped in vacuo at 1 mm. for 5 hours. The crude product weighed 66 grams, had a refractive index $n_D^{25}=1.4835$ and contained 6.5 percent nitrogen by Kjeldahl analysis. Distillation gave a fraction boiling at 122° F./mm., $n_D^{25}=1.4745$, containing 7.2 percent nitrogen or an indicated 90 percent purity for 4-(tert-butylsulfenyl) morpholine. A minor proportion of 4-(tert-butylthiosulfenyl) morpholine [i. e., N,N - (3 - oxapentamethylene) - tert - butylthiosulfenamide] was formed. Analyses also indicated 19.2 percent sulfur, 54.4 percent carbon and 10.1 percent hydrogen. Theoretical values for $C_8H_{17}NOS$ are: 18.5 percent sulfur, 55.0 percent carbon, 9.7 percent hydrogen and 8.0 percent nitrogen.

EXAMPLE II

Di-tert-butyldisulfide (0.5 mol—89 grams) was dissolved in 200 grams C. P. n-pentane. Chlorine (0.5 mol—35.5 grams) was added by bubbling through the solution while holding the temperature at about 85° F. There was no evolution of hydrogen chloride during the first 20 percent of the reaction but vented hydrogen chloride became appreciable towards the end of the chlorine addition. Tertiary butyl sulfenyl chloride was formed as a predominant product together with a minor amount of tertiary butyl thiosulfenyl chloride. Morpholine (2.5 mols—220 grams) was added, giving a vigorous reaction and a heavy precipitate. The product was washed first with water and then with acid, dried and the pentane removed in vacuo. 134 grams of a light golden colored liquid remained after stripping in vacuo at 1 mm. for 5 hours. The crude product had a refractive index $n_D^{25}=1.4835$ and contained 6.7 percent nitrogen by Kjeldahl analysis. This indicated a purity of about 84 percent for 4-(tert-butylsulfenyl)morpholine. A minor proportion of 4-(tert-butylthiosulfenyl) morpholine [i. e., N,N - (3 - oxapentamethylene) - tert - butylthiosulfenamide] was formed. Distillation of 100 grams of product gave the following cuts:

1. 46 ml. $n_D^{25}=1.4750$, B. P. 122° F./1 mm.
2. 5 ml. $n_D^{25}=1.4750$, B. P. 122-130° F./1 mm.
3. Residue $n_D^{25}=1.4910$.

This example shows the use of a disulfide as the starting material.

EXAMPLE III

Tert-butyl mercaptan (0.5 mol—45 grams) was dissolved in 400 grams C. P. n-pentane. Chlorine (0.5 mol—35.5 grams) was added by bubbling while holding the reaction temperature at about 85° F. The product was then added slowly to a stirred solution containing aniline and n-pentane. The crude product was washed with dilute acid and with water and was subsequently dried and distilled. The product had a boiling range 135–140° F./1 mm. and analysis indicated 85% sulfenamide content based on Kjeldahl nitrogen analysis comprising phenyl tert-butyl-sulfenamide as predominant product together with a minor proportion of phenyl tertiary butylthiosulfenamide.

EXAMPLE IV 1-(isopropyl sulfenyl) piperidine was prepared by dissolving 76 grams (1 mol) of isopropyl mercaptan in 1200 ml. of isopentane, heating to 86° F. and adding thereto a stream of gaseous chlorine, under reflux, until 71 grams had been added, after which the reaction mixture, containing isopropyl sulfenyl chloride, was passed to a second reactor and admixed with 170 grams of piperidine dissolved in 200 cc. isopentane. The mixture was stirred for 30 minutes, washed with 500 ml. of water and the isopentane was removed by fractionation and the product distilled in vacuo. A crude yield of 142 grams was obtained representing a yield of 89 percent. The product was distilled to give 130 grams (82%) of sulfenamide. Properties of the 1-(isopropylsulfenyl) piperidine thus obtained were, boiling point 140-142° F. at 8 mm., index of refraction $n_D^{20}=1.4812$.

EXAMPLE V

The experiment of Example IV was repeated for the preparation of 1-(ethyl sulfenyl) piperidine. Sixty-two grams of ethyl mercaptan dissolved in 1200 ml. of isopentane was chlorinated at 86° F., under reflux. The halogenation effluent, containing ethyl sulfenyl chloride, was added to a solution of 170 grams of piperidine in isopentane. The crude yield of product was 127 grams (88%). The crude product was distilled to give 108 grams (74%) of pure sulfenamide, with a boiling point of 122° F. at 7 mm., $n_D^{20}=1.4900$. Sulfur analysis: Found 21.97%, calculated 22.07%.

Repeating the experiment except that the piperidine solution was added to the ethylsulfenyl chloride solution gave a yield of pure product of 46.5%.

EXAMPLE VI 1-(tert-butylsulfenyl) piperidine was prepared as follows: 135 grams of tertiary-butyl mercaptan was chlorinated in 950 ml. of isopentane at 70 to 75° F., by passing 105 grams of chlorine into the solution over a period of 2 hours. The effluent was passed to the amination reactor and admixed with 255 grams of piperidine. After washing and depentanizing a crude yield of 190 grams (74 percent of theory) was obtained. The product was purified by distillation to yield 133 grams (52%) of pure sulfenamide. Properties of the product are: boiling point 133° F. at 5 mm., $n_D^{20}=1.4768$. Sulfur analysis: Found 19.55, calculated 18.5.

EXAMPLE VII

Tert-butylthiosulfenyl chloride was prepared by dissolving 0.75 mol of ditertiary-butyl disulfide in 1600 ml. of isopentane, cooling to −100° F. and passing a stream of dry chlorine into the well-stirred solution until an equivalent amount (0.75 mol) of chlorine had been added. Loss of unreacted chlorine was substantially reduced by venting the reactor through a condenser cooled by Dry Ice. The mixture was stirred vigorously during the addition of the chlorine and for one hour thereafter. Nitrogen was used to blanket the reaction mixture.

The yield of tertiary-butylthiosulfenyl chloride was determined by preparing the piperidine derivative which is formed substantially quantitatively and which is stable and easily isolated by distillation. Thus the yield of 1-(tert-butylthiosulfenyl) piperidine gives a direct measure of the yield of tertiary-butylthiosulfenyl chloride obtained. It was found that 92 percent of the disulfide reacted had been converted to tertiary-butylthiosulfenyl chloride and 8 percent to tertiary-butylsulfenyl chloride.

The 1-(tert-butylthiosulfenyl) piperidine [i. e., N,N-pentamethylene-tert-butylthiosulfenamide] from tertiary-butylthiosulfenyl chloride and piperidine was distilled at 172.4° F. under 1 mm. pressure. Its index of refraction was $n_D^{20}=1.5210$ and upon analysis showed 7.04 percent nitrogen and 30.42 percent sulfur as compared with calculated values of 6.83 and 31.22 percent, respectively.

EXAMPLE VIII

A series of four runs was made in which the experiment of Example VII was repeated using operating temperatures of −103, −49, 32, and 86° F., respectively. The product from each run was converted to the piperidine derivative and the comparative yields of tertiary-butylthiosulfenyl chloride and tertiary-butylsulfenyl chloride for each run determined by this method. The results are tabulated below.

| Run | Temperature chlorination (° F.) | Thiosulfenyl chloride yield (percent) | Sulfenyl chloride yield (percent) |
| --- | --- | --- | --- |
| 1 | −103 | 89 | 8 |
| 2 | −49 | 77 | 19 |
| 3 | 32 | 31 | 65 |
| 4 | 86 | 13 | 83 |

By this series of runs it was demonstrated that at low temperatures, symmetrical cleavage of the disulfide to form sulfenyl chloride is suppressed, and a high degree of conversion to tertiary-butylthiosulfenyl chloride is obtained.

EXAMPLE IX

A run was made in which n-butyl disulfide, dissolved in isopentane, was treated with elemental chlorine at −40° F. The reaction product, containing n-butylsulfenyl chloride, was added to a solution of piperidine in aqueous caustic. Recovery of the product formed provided 170 grams (98 percent yield) of crude material which when distilled gave 47 grams (85 percent yield) of material which, by its boiling point and refractive index, was identified as 1-(n-butylsulfenyl) piperidine; boiling point, 138.2–140° F. at 0.5 mm. and $n_D^{20}$, 1.4858.

EXAMPLE X

A run was made in which isopropyl mercaptan was dissolved in isopentane and converted to disulfide and treated with elemental chlorine at −40° F. The reaction product solution was added to a solution of piperidine in aqueous caustic. The product recovered was found to be 1-(isopropylsulfenyl) piperidine in an 83 percent yield based on mercaptan charged.

EXAMPLE XI 175 grams (0.75 mol) of a di-tert-hexyl disulfide fraction having a boiling point of 194° F. at 4 mm. were dissolved in 1600 ml. of isopentane, and the solution was refluxed during the addition of 0.75 mol of chlorine. The resulting solution, containing a predominant proportion of tert-hexylsulfenyl chloride and a minor proportion of tert-hexylthiosulfenyl chloride, was added to a mixture of 127 grams (1.5 mols) of piperidine in 200 ml. of pentane and 60 grams of sodium hydroxide in 200 ml. of water. The product was depentanized and distilled to yield 267 grams (89%) of crude material. This product was distilled to give 194 grams (65%) of 1-(tert-hexylsulfenyl) piperidine fraction boiling from 161.6 to 176° F. at 2 mm. and having a refractive index, $n_D^{20}$, 1.4822 to 1.4862. A minor proportion of 1-(tert-hexylthiosulfenyl) piperidine [i. e., N,N-pentamethylene-tert-hexylthiosulfenamide] was also formed.

EXAMPLE XII

Two runs were made, charging in each case, 103 grams of di-tertiary-amyldisulfide dissolved in 900 ml. of isopentane and chlorinating in an inert atmosphere at 86° F. and −40° F., respectively. Tertiary amyl sulfenyl chloride and tertiary amyl thiosulfenyl chloride were produced respectively as chief products of these runs. The reaction mixture from each run was added to a solution of 45 grams of dimethylamine and 40 grams of sodium hydroxide in 200 ml. of water. The solvent was then removed and the product distilled under reduced pressure.

From the run made at 86° F., 128 grams of crude product was obtained. The middle cut from the distillation of this material provided 78 grams of product boiling at 134° F. under 30 mm. pressure. This product had an index of refraction of 1.4510 and was found to have a sulfur content (semimicro Carius) of 21.1 percent, agreeing closely with the calculated value of 21.7 percent for N,N-dimethyl-tertiary-amylsulfenamide.

From the run made at −40° F., 92 grams of crude product was obtained. The middle cut from the distillation of this material provided 46 grams of product boiling between 140 and 185° F. at 4 mm. pressure. This product had an index of refraction of 1.5069 and a sulfur content (semimicro Carius) of 33.7 approximating the calculated value of 35.6 percent for N,N-dimethyl-tertiary-amylthiosulfenamide.

Based on the separations made in the fractionations the yields from these runs were as follows:

| | | |
|---|---|---|
| Chlorination temperature °F | 86 | −40 |
| Yield of sulfenamide (percent) (based on disulfide) | 71 | 7 |
| Yield of thiosulfenamide (percent) (based on disulfide) | 23 | 86 |
| Total yield (percent) | 94 | 93 |

EXAMPLE XIII

In a series of runs, conducted at various temperature levels, tertiary butyl mercaptan and di-tertiary butyl disulfide were separately reacted with chlorine, in the presence of a hydrocarbon solvent to form tertiary butylsulfenyl chloride. The preparations were carried out under refluxing or nonrefluxing conditions dependent upon whether the reaction temperature was below the boiling point of the reaction mixture (atmospheric pressure); the reaction mixture being blanketed with nitrogen, when employing non-refluxing conditions.

Tertiary butyl mercaptan, or the di-tertiary-butyl disulfide, and solvent, were charged to the reaction flask, agitation by stirring was initiated, and the resulting solution was heated to reaction temperature. Upon reaching reaction temperature, chlorine was introduced to the stirred reaction mixture and addition was continued until substantially one mol of chlorine per mol of mercaptan or disulfide reactant had been added. Under these conditions chlorine reacted with the disulfide or mercaptan to form the corresponding alkyl sulfenyl chloride. The reaction mixture was then cooled to room temperature, and product yield (tertiary butylsulfenyl chloride) was determined, based upon substantially quantitative reaction of the chloride product with sodium dimethyl dithiocarbamate to produce N,N-dimethyl-tert-butylsulfenyl dithiocarbamate, the latter reaction and product recovery being conducted by admixing total reaction mixture with a molar equivalent (of 100% yield of chloride product) of 40% aqueous sodium dimethyl dithiocarbamate solution, stirring the resulting solution admixture for about 7 minutes, separating the phases, washing the oil phase with water, and crystallizing the resulting N,N-dimethyl-tert-butylsulfenyl dithiocarbamate from the washed oil phase.

In the runs, the following reactant quantities were employed:

| | Disulfide | Mercaptan |
|---|---|---|
| Solvent cc | 575 | 575 |
| Di-t-butyl disulfide (10% excess) grams | 70.2 | |
| t-Butyl mercaptan (10% excess) do | | 70.9 |
| Chlorine do | 25.8 | 51.6 |
| Sodium dimethyldithiocarbamate (40% aqueous) grams | 260 | 260 |

Results of these runs are set forth in the following tabulation:

Table I

| Run No. | Starting material | Solvent | Chlorination temperature (° F.) | Yield [1] of tertiary butylsulfenyl chloride (mol percent) |
|---|---|---|---|---|
| 1 | Di-tert-butyl disulfide | n-Heptane | 80 to 90 | 75.5 |
| 2 | do | do | 204 | 68.3 |
| 3 | do | Kerosene | 208 to 217 | 66.5 |
| 4 | do | do | 208 to 217 | 65.2 |
| 5 | do | do | 296 to 304 | 39.2 |
| 6 | do | do | 296 to 304 | 33.8 |
| 7 | tert-Butyl mercaptan | do | 27 to 32 | 42.7 |
| 8 | do | do | 208 to 217 | 35.9 |
| 9 | do | do | 298 to 306 | 27.3 |

[1] Based on N,N-dimethyl-tert-butysulfenyl dithiocarbamate recovered.

As illustrated by the above data, the temperature range is rather broad in which alkyl sulfenyl halides are formed in accordance with my invention, relatively high yields of halide products being obtained at temperatures as high as 300° F., and higher.

EXAMPLE XIV

Tertiary butylsulfenyl chloride was prepared by interreaction of di-tert-butyl disulfide with chlorine in accordance with the procedure of Example XIII, employing n-heptane as an inert solvent, in the presence of variable concentrations of water, the latter added with disulfide reactant to the reaction system. After the reaction, nitrogen was bubbled through the reaction solution to remove any remaining by-product hydrogen chloride. Product yields were determined in accordance with the procedure of Example XIII.

In each run the reactant quantities employed were as follows:

| | |
|---|---|
| n-Heptane cc | 575 |
| Di-tert-butyl disulfide (10% excess) grams | 70.2 |
| Water | Variable |
| Chlorine grams | 25.8 |
| Sodium dimethyldithiocarbamate (40% aqueous) grams | 260 |

All runs were conducted at 80–90° F. Resulting data are set forth in the following tabulation:

Table II

| Run No. | Water (vol. percent of solvent) | Moles water per atom of chlorine | Yield of tertiary butylsulfenyl chloride (mols percent) |
|---|---|---|---|
| 10 [a] | 0 | 0 | 90.9 |
| 11 [b] | 0 | 0 | 90.4 |
| 12 | 1 | 0.45 | 79.5 |
| 13 | 5 | 2.25 | 66.5 |
| 14 | 10 | 4.50 | 62.2 |

[a] Tert-butylsulfenyl chloride prepared under anhydrous conditions.
[b] No special precautions taken to exclude water during preparation of tert-butysulfenyl chloride.

These data illustrate that although the halide-forming reaction of this invention can be conducted in the presence of water, such as 10 volume percent, or higher, somewhat higher yields are obtained when lower concentrations of water are present. Also, the data illustrate that when reactants are employed in their normal state of purity (normal water content) substantially the same product yield is obtained as when they are predried.

EXAMPLE XV

Tertiary butylsulfenyl chloride was prepared by reacting di-tertiary butyl disulfide with chlorine, in the absence of an inert solvent; an excess of the disulfide reactant being employed and serving as a reaction mixture diluent. Except for the absence of solvent, the present run was carried out, and product yield was determined, in accordance with the procedure of Example XIII. In carrying out this run, 650 cc. of di-tert-butyl disulfide, and 25.8 grams of chlorine were introduced into the reaction system maintained at 80.6–89.6° F., the product yield (tert-butylsulfenyl chloride) being 53.8 mol percent.

These data illustrate that in carrying out the process of this invention it is not required that an inert solvent be employed, i. e., only the halogen, disulfide or mercaptan reactants need be introduced into the reaction system to produce the halide products of this invention.

Reasonable variation and modification are possible within the scope of the foregoing disclosure, drawings and appended claims to the invention, the essence of which is (1) the production of alkyl sulfenyl halides and/or tertiary alkyl thiosulfenyl halides by effecting reaction of equimolar proportions of halogen with an alkyl mercaptan and/or a dialkyl disulfide; (2) tertiary alkyl thiosulfenyl halides as new compounds; (3) the production of alkyl sulfenamides and/or alkyl thiosulfenamides by effecting reaction of equimolar proportions of halogen with an alkyl mercaptan and/or a dialkyl disulfide and with a nitrogen compound selected from the group consisting of ammonia and primary and secondary amines; and (4) tertiary alkyl thiosulfenamides as new compounds.

I claim:

1. As a new compound a compound selected from the group consisting of tertiary-alkylthiosulfenamide, having 1–12 carbon atoms in the alkyl group, and a substituted tertiary-alkylthiosulfenamide, having 1–12 carbon atoms in the alkyl group, the substituents at the nitrogen atom being selected from the group consisting of alkyl, cycloalkyl, alkylcycloalkyl, cycloalkylalkyl, aryl, alkaryl, aralkyl, alkylene and oxalkylene radicals said alkylene and oxaalkylene radicals together with nitrogen forming a heterocyclic ring.

2. As a new compound, N,N-pentamethylene-tert-butylthiosulfenamide.

3. As a new chemical compound, N,N-dimethyl-tertiary-amylthiosulfenamide.

4. As a new compound, N,N-(3-oxapentamethylene)-tert-butylthiosulfenamide.

5. As a new compound, N-phenyl-tert-butylthiosulfenamide.

6. As a new compound, N,N-pentamethylene-tert-hexylthiosulfenamide.

7. A process which comprises reacting in a reaction mass a compound selected from the group consisting of an alkyl mercaptan and a dialkyl disulfide having 1–12 carbon atoms in the alkyl group with an equimolar proportion of halogen to form a halide selected from the group consisting of an alkyl sulfenyl halide and a tertiary alkyl thiosulfenyl halide and with a nitrogen compound selected from the group consisting of ammonia and primary and secondary amines to form an amide selected from the group consisting of alkyl sulfenamides and tertiary alkyl thiosulfenamides.

8. A process of claim 7 wherein said nitrogen compound is an amine selected from the group consisting of morpholine, aniline, piperidine and dimethyl amine, and wherein the first said reactant compound is a sulfide selected from the group consisting of ethyl mercaptan, isopropyl mercaptan, tertiary butyl mercaptan, di-tert-butyldisulfide, di-n-butyldisulfide, di-tert-amyldisulfide and di-tert-hexyl disulfide.

9. A process of claim 8 wherein the said halogen reactant is chlorine.

10. A process of claim 7 wherein said sulfide and halogen are reacted, and said amine is then added to the resulting reaction mixture.

11. The process which comprises reacting a compound selected from the group consisting of alkyl mercaptans and dialkyl disulfides having 1–12 carbon atoms in the alkyl group with a halogen in an inert solvent at a temperature within the range of $-300$ to $400°$ F. and with a nitrogen compound selected from the group consisting of ammonia and primary and secondary amines to form an amide selected from the group consisting of alkyl sulfenamides and tertiary alkyl thiosulfenamides as the principal reaction product.

12. The process which comprises reacting a compound selected from the group consisting of primary and secondary alkyl mercaptans and dialkyl disulfides having 1–12 carbon atoms in the alkyl group with a halogen in an inert solvent and at a temperature within the range of $-300$ to $400°$ F. to form a halide selected from the group consisting of primary and secondary alkyl sulfenyl halides and commingling with the thus-formed reaction mixture a nitrogen compound selected from the group consisting of ammonia and primary and secondary amines to form an amide selected from the group consisting of primary and secondary alkyl sulfenamides.

13. The process which comprises reacting a compound selected from the group consisting of tertiary alkyl mercaptans and dialkyl disulfides having 1–12 carbon atoms in the alkyl group with a halogen in an inert solvent and at a temperature within the range of $-300$ to $400°$ F. to form a halide selected from the group consisting of tertiary alkyl sulfenyl halides and tertiary alkyl thiosulfenyl halides and commingling with the thus-formed reaction mixture a nitrogen compound selected from the group consisting of ammonia and primary and secondary amines to form an amide selected from the group consisting of tertiary alkyl sulfenamides and tertiary alkyl thiosulfenamides.

14. The process which comprises reacting a compound selected from the group consisting of tertiary alkyl mercaptans and dialkyl disulfides having 1–12 carbon atoms in the alkyl group with a halogen in an inert solvent and at a temperature above $-30°$ F. but not above $250°$ F. to form a tertiary alkyl sulfenyl halide and commingling with the thus-formed reaction mixture a nitrogen compound selected from the group consisting of ammonia and primary and secondary amines to form a tertiary alkyl sulfenamide.

15. The process which comprises reacting a compound selected from the group consisting of tertiary alkyl mercaptans and dialkyl disulfides having 1–12 carbon atoms in the alkyl group with a halogen in an inert solvent and at a temperature within the range of −300 to −30° F. to form a tertiary alkyl thiosulfenyl halide and commingling with the thus-formed reaction mixture a nitrogen compound selected from the group consisting of ammonia and primary and secondary amines to form a tertiary alkyl thiosulfenamide.

16. A process which comprises reacting in a reaction mass a compound selected from the group consisting of an alkyl mercaptan and a dialkyl disulfide having 1–12 carbon atoms in the alkyl group with an equimolar proportion of halogen to form a halide selected from the group consisting of an alkyl sulfenyl halide and a tertiary alkyl thiosulfenyl halide as a principal reaction product, and adding a nitrogen compound selected from the group consisting of ammonia and primary and secondary amines to form an amide selected from the group consisting of alkyl sulfenamides and tertiary alkyl thiosulfenamides.

17. The process of claim 7 wherein the temperature of reaction is from −125 to −50° F., and the said reactant compound is a tertiary alkyl compound, whereby a tertiary alkyl thiosulfenamide is produced as predominant product.

18. The process of claim 7 wherein the temperature of reaction is above −30° F., and the said reactant compound is a tertiary alkyl compound, whereby a tertiary alkylsulfenamide is produced as predominant product.

19. A process of claim 7 wherein the said reactant compound is reacted with halogen at a temperature in the range of −300 to 400° F.

20. A process of claim 19 wherein said temperature is in the range of −125 to 250° F.

21. A process of claim 19 wherein said temperature is in the range of −125 to 150° F.

22. A process of claim 19 wherein said temperature is in the range of −300 to −30° F.

23. A process of claim 19 wherein said temperature is in the range of −125 to −50° F.

24. A process of claim 19 wherein said temperature is above −30° F.

25. A process of claim 19 wherein said temperature is in the range of −40 to 250° F.

26. A process of claim 8 wherein the said reactant compound is reacted with said halogen at a temperature in the range of −300 to 400° F., wherein from 2 to 4 mols of said nitrogen compound per mol of halogen is introduced into said reaction and wherein amination is effected at a temperature in the range of −20 to 120° F.

27. A process of claim 26 wherein said halogen is chlorine.

28. A process of claim 19 wherein amination is effected at a temperature in the range of −300 to 400° F.

29. A process of claim 19 wherein amination is effected at a temperature in the range of −20 to 120° F.

30. A process of claim 19 wherein amination is effected at a temperature in the range of 40 to 60° F.

31. A process which comprises reacting a compound selected from the group consisting of tertiary butyl mercaptan and ditertiary butyl disulfide with a halogen and with piperidine to form tertiary-butylthiosulfenyl piperidine and recovering said tertiary-butylthiosulfenyl piperidine as product of the process.

32. A process of claim 31 wherein said reacting is in presence of an inert solvent at a temperature in the range of −300 to −30° F.

References Cited in the file of this patent

UNITED STATES PATENTS

| | | |
|---|---|---|
| 2,439,734 | Himel et al. | Apr. 13, 1948 |
| 2,520,401 | Himel et al. | Aug. 29, 1950 |